United States Patent [19]

Sabate et al.

[11] Patent Number: 5,317,047
[45] Date of Patent: May 31, 1994

[54] COMPOSITION ADAPTED TO BE USED FOR MANUFACTURING STOPPERS AND PROCESS OF MANUFACTURE

[75] Inventors: Bernard Sabate, Ceret; Joël Masse, Le Gue de Velluire; Gérard Jeanty, Perpignan, all of France

[73] Assignee: Bouchons A Champagne Sabate, S.A., Ceret, France

[21] Appl. No.: 924,009

[22] PCT Filed: Jan. 14, 1992

[86] PCT No.: PCT/FR92/00022

§ 371 Date: Sep. 22, 1992

§ 102(e) Date: Sep. 22, 1992

[87] PCT Pub. No.: WO92/12848

PCT Pub. Date: Aug. 6, 1992

[30] Foreign Application Priority Data

Jan. 25, 1991 [FR] France ................. 9101127

[51] Int. Cl.$^5$ ............ C08K 11/00; B65D 39/00; B65D 39/12
[52] U.S. Cl. ........................ 524/16; 215/355; 215/358
[58] Field of Search ............... 524/16; 215/355, 358

[56] References Cited

U.S. PATENT DOCUMENTS 4,042,543  8/1977  Strickman et al. ............. 260/17.4
4,188,457  2/1980  Throp ........................... 215/315

FOREIGN PATENT DOCUMENTS 2528346  12/1963  France .
2278472   2/1976  France .
2390396   1/1979  France ........................ 524/16
 517798   2/1940  United Kingdom .

OTHER PUBLICATIONS

Patent Abstracts of Japan, vol. 4, No. 6(C-9)(543) May 8, 1980 and JP,A.55029550 (Dainippon Ink Kagaku Kogyo K.K. Mar. 1, 1980.
Japanese Patents Gazette Section Ch, Week C45, Dec. 17, 1980, Derwent Publications Ltd., London, GB; Class A, p. 18, AN80035 C/45 and JP,A,55125129 (Kanegafuchi Chem. K.K.) Sep. 26. 1980.

Primary Examiner—Paul R. Michl
Assistant Examiner—LaVonda DeWitt
Attorney, Agent, or Firm—Ladas & Parry

[57] ABSTRACT

This invention relates to a composition which may be used in particular for manufacturing stoppers and to a process for manufacturing same.

A composition is principally constituted by particles of ligneous plant matters such as natural cork or wood, by a plastics material of closed cellular structure such as expansible microspheres, and by a binding agent; a stopper comprises at least one active part constituted by a composition according to the invention, and said binding agent is a glue suitable for contact with foodstuffs, for example of the polyurethane or acrylic type.

The technical domain of the invention is that of the cork industry.

15 Claims, No Drawings

COMPOSITION ADAPTED TO BE USED FOR MANUFACTURING STOPPERS AND PROCESS OF MANUFACTURE

The present invention relates to a composition adapted to be used in particular for manufacturing stoppers, and to its process for manufacture.

The technical domain of the invention is that of the cork industry.

Much research has been made for developing compositions whose properties are close to those of natural cork and which enable it to be replaced, particularly for the manufacture of stoppers, for example stoppers intended for closing wine bottles.

In fact, the harvesting of cork is limited to a few regions in the world where cultivation of corkoaks is economically viable, and the production of natural cork hardly responds to the needs.

Such research has led to manufacturing stoppers of cork agglomerate constituted by particles of cork and a binding agent or glue which ensures cohesion of the stopper.

Unfortunately, the cork agglomerate does not present the same characteristics as natural cork, which means that the cork agglomerate stoppers are used only for the conservation of wines of lesser quality which are not intended to age in the bottle.

The natural cork which serves for the conventional manufacture of stoppers also has shortcomings: in fact, depending on the quality of the natural cork with which it is made, the stopper obtained presents defects often visible to the naked eye or in the form of large cavities, which may be the cause of defective tightness and which are sometimes filled with cork powder in order to improve the stopper's appearance and to overcome these defects in tightness; furthermore, this disparity in quality has led the manufacturers to distinguish about six classes of quality of stoppers; in addition, certain stoppers in low-quality natural cork give the wine with which they are in prolonged contact, undesirable tastes.

It has also been attempted to manufacture entirely synthetic stoppers, particularly based on polyurethane or other plastics materials.

Canadian Patent Application 1 177 600 (PAISLEY et al) describes and claims a method of manufacturing stoppers of plastics material (such as an ethylene-vinyl acetate copolymer) by moulding.

U.S. Pat. 4 042 543 (STRICKMAN et al) describes a composition for the manufacture of stoppers, which comprises polyethylene or ethylene vinyl acetate copolymer mixed with particles of natural cork; production of this composition includes an operation of heating at about 250° C., allowing fusion of the copolymer.

Other documents describe products and processes which attempt to overcome the shortcomings of natural cork stoppers, such as for example Patent Application DE 2 910 692 (PFEFFER KORN) which describes and claims stoppers for bottles which comprise a capsule made of an absolutely gas-tight material, for example a metal capsule; this method presents the particular drawback of preventing the wine from ageing due to this perfect tightness.

All known stoppers, their processes of manufacture and their composition therefore present drawbacks.

The problem raised is therefore that of providing a composition, its process of manufacture and its use for the manufacture of stoppers, particularly for wine bottles, which maintain the advantages of natural cork, which therefore present similar physical characteristics, without being penalized by the drawbacks associated with the disparity in quality of these stoppers, and which enables stoppers and other products using this composition to be obtained, which present an outer appearance very similar to natural cork and which do not present the drawbacks of known synthetic stoppers, particularly their lack of elasticity, their too perfect tightness to gas, their outer appearance different from natural cork.

One solution to the problem raised consists in producing a composition principally constituted by particles of ligneous plant matter, a plastics material of closed cellular structure and a binding agent, and such that the mean dimension of the cells of said closed cellular structure is less than 1 millimeter and said mean dimension is preferably included between 10 microns and 200 microns, with the result that said cells are capable of containing a fluid (liquid and/or gaseous) constituting an expansion agent of said cells, and are therefore expansible and/or compressible Said cells advantageously contain a hydrocarbon such as isobutane, and are substantially tight.

Said particles of this composition are advantageously mostly fine particles whose mean dimension is less than 300 microns and preferably included between 100 and 200 microns.

In this composition, said particles which are not said fine particles are advantageously large particles whose mean dimension is less than 5 millimeters.

Said ligneous plant material of this composition advantageously principally constituted by natural cork.

In this composition, said plastics (thermoplastics) material of closed cellular structure is advantageously principally constituted by a material selected from a polymer or copolymer of vinyl chloride, a polymer or copolymer of vinylidene chloride, a polymer or copolymer of vinyl chloride and acrylonitrile, a polymer or copolymer of vinylidene chloride, acrylonitrile and methyl methacrylate and/or a polymer or copolymer of styrene and acrylonitrile, a polymer or copolymer of ethylene or vinyl acetate; preferably, said plastics material of closed cellular structure is principally constituted by microspheres of a copolymer of methyl methacrylate and acrylonitrile, preferably comprising at least one part of methyl methacrylate for five parts of acrylonitrile.

One solution to the problem also consists in providing a process for manufacturing this composition, which comprises the following operations of:

mixing particles of ligneous plant matter with a plastics material of closed cellular structure, adding to said mixture a binding agent so as to obtain a homogeneous pulverulent product, introducing said homogeneous pulverulent product into a shaping device, preferably a mould or die, rapidly heating said product introduced in said shaping device, up to a temperature ($T_1$), in order to expand said cells, removing from said shaping device the product obtained, said temperature ($T_1$) being included between 90° and 200° C., and preferably between 100° and 150° C.

It is important to avoid exceeding the limit of 200° C. to a notable extent, in order to avoid bursting of said cells and/or fusion of said plastics material, which would result in a considerable degradation of the characteristics of the products obtained (particularly the elasticity).

After having removed said product obtained from said shaping device, said product obtained is advantageously maintained at a temperature ($T_2$) for a few hours, and said temperature ($T_2$) is included between 50° and 120° C. and preferably between 70° and 100° C.

A solution to the problem raised consists in employing the processes and compositions according to the invention to manufacture at least a part (hereinafter referred to as "active part") of stoppers.

The words "active part" may designate all or part of a stopper, for example the lower part of a stopper for example of champagne which may be of shape similar to the disc or discs of natural cork which are bonded and constitute the lower part of known champagne stoppers.

The stopper advantageously comprises at least one active part which is constituted by a composition according to the invention, and said binding agent is a glue suitable for contact with foodstuffs, preferably of polyurethane or acrylic type, with the result that said active part is elastic and tight to liquids whilst conserving a low permeability to gases.

In a particular embodiment of stoppers made of the composition according to the invention, said non-expanded cells of said composition have a mean diameter of the order of 5 to 28 microns, and, after expansion, said expanded cells of said active part of said stopper have a mean diameter of the order of 40 to 100 microns.

The proportion by mass of said particles of ligneous plant matter in said active part of said stopper is advantageously included between 1% and 85% and preferably between 15% and 75%.

The proportion by mass of said plastics material with closed cellular structure in said active part of said stopper is advantageously included between 1% and 60% and preferably between 2% and 25%.

The proportion by mass of said binding agent in said active part of the stopper is advantageously included between 5% and 70%, and preferably between 15% and 60%.

The proportion by mass of water in said active part of said stopper is advantageously less than 15% and preferably less than 10%.

Said active part advantageously presents a proportion of void or hollow spaces filled with air or said fluid, greater than 50%, which makes it possible easily to compress said active part of said stopper in order to introduce said stopper in a bottle.

Said active part advantageously further comprises a latex, preferably in the form of polyisoprene emulsion.

The compositions and the stoppers manufactured with this composition, particularly with the processes according to the invention, present numerous advantages: the composition and the products obtained with this composition, particularly stoppers, have an outer visual appearance extremely similar to cork thanks in particular to the possible use of pigments or colorants; the composition and the products obtained, particularly stoppers, also present a good homogeneity and make it possible to obtain a very good repeatability of the physical characteristics of the products manufactured from this composition, particularly the mechanical characteristics of elasticity as well as the characteristics of tightness of the products obtained; in the application of the invention to the manufacture of stoppers, an effort of stopping is therefore advantageously obtained which is constant due to the repeatability of its mechanical characteristics; furthermore, the composition makes it possible to obtain products, particularly stoppers, which age very little, which therefore present characteristics which are relatively very stable in time and, in the case of application to stoppers, therefore allow the wine to age in the bottles closed by such stoppers.

It should also be noted that, in the preferred case of using said expansible microspheres constituting the plastics material of closed cellular structure, which microspheres contain isobutane, said microspheres may be expanded at relatively low temperatures, close to 100° C.

It may also be noted that the composition according to the invention may be used for manufacturing products of various shapes, such as sections, panels (from which stoppers may be cut-out).

Thanks to the particular dimensions of the individualized microspheres constituting said plastics material of closed structure, a composition and stoppers are obtained according to the invention whose visual appearance is comparable to that of natural cork.

The numerous advantages procured by the invention will be more readily appreciated on reading the following non-limiting description which describes particular modes of using the composition for manufacturing stoppers and the principal steps of a process in accordance with the invention A composition according to the invention is principally constituted by three components:

a ligneous plant matter which, for manufacturing stoppers, is preferably natural cork reduced to powder of fine particles possibly mixed with large particles or granules, but which, for other applications, may possibly be replaced by wood powder and/or granules;

a plastics material with closed cellular structure whose cells present a mean internal dimension of the order of 10 to 200 microns, and, in the case of using this composition for the manufacture of stoppers, it is advantageous to use microspheres of a copolymer of methyl methacrylate and of acrylonitrile, sometimes called expansible microspheres;

a binding agent which, in the case of using the composition for manufacturing stoppers, is preferably a glue suitable for contact with foodstuffs, of the polyurethane or acrylic type.

Depending on the use envisaged, it may be advantageous to add to these three basic products constituting the composition according to the invention, additives such as coupling agents, stabilizers, pigments or colorants, lubricants, water.

It may also be advantageous to add to this basic composition according to the invention, a latex, for example in the form of a polyisoprene emulsion, which contributes to modifying and substantially improving the cohesion of the final product; waxes or paraffins may also be added in order to reduce the coefficient of friction of the products obtained from the composition according to the invention and thus to facilitate demoulding of the products obtained and also improve their conditions of use.

In a process for manufacturing this composition which may be used for manufacturing stoppers from this composition or stoppers comprising an active part of this composition, the following operations are carried out:

In order to obtain a mixture of the three principal components of the composition according to the invention, which is perfectly homogeneous and sufficiently stable to proceed with the operation of moulding or shaping under good conditions, the particles of ligneous plant matter are previously mixed with the plastics material of closed cellular structure and with the binding agent; in a particular case of using this process for manufacturing stoppers, the cork powder constituted by fine particles of mean dimension smaller than 300 microns and preferably between 100 and 200 microns, is firstly mixed possibly with cork granules, also called large particles, whose mean dimension is advantageously smaller than 3 millimeters, with the expansible or expanded microspheres; this mixing operation is preferably carried out in a closed vessel to avoid the emission of dust in the atmosphere; the homogeneous pulverulent product obtained by this mixture is then mixed or blended with polyurethane glue until a second homogeneous pulverulent product is obtained whose colour is very close to that of cork;

The emulsion of latex and/or water and/or the lubricating agent may then possibly be added and stirring continued for some minutes; it should be noted that the success of these operations does not depend on the order of introduction of the products in the mixer;

The final granular, homogeneous, pulverulent product obtained, which may be transported for example by conveyor belt or by endless screw, may remain in contact with the atmosphere some tens of minutes as it is, without modification of its structure nor of its behaviour during subsequent moulding or extrusion;

An adequate quantity of this pulverulent mixture is introduced homogeneously in a mould for example, preferably a metal one, which comprises cavities having the shape and dimensions of the product to be obtained, for example a stopper or the active part of a stopper which it is desired to manufacture;

When said mould is filled with said mixture, in the present embodiment of a stopper, between 4.5 and 5 grams of said mixture are introduced into each cavity intended to produce a stopper, the mould is closed and heated as quickly as possible to about 150° C.; at that temperature, said expansible microspheres expand rapidly and the stopper or object manufactured acquires its definitive shape; this heating operation lasts some minutes, of the order of 2 to 3 minutes;

This heating operation is then stopped and the mould cools, the products then being maintained at a temperature close to 100° C. for some minutes during which said binding agent or polyurethane glue sets and ensures cohesion of the constituents of said stopper;

The mould is then opened and the stopper is ejected;

In order to allow the polyurethane glue to finish producing its effects, the stoppers or products obtained, which have been removed from said mould or shaping device, are left at a temperature close to 90° for several hours, for example for 2 to 8 hours, in order to obtain the desired characteristics.

In a variant composition according to the invention and process for manufacturing products, particularly stoppers according to the invention, expanded microspheres may be used in place of the expansible microspheres, and, in that case, the heating phase will be effected at a lower temperature, of the order of 100° to 120° C.; in that case, it will be advantageous to compress the initial composition or the pulverulent product obtained by the mixture after introduction in the mould.

For manufacturing stoppers from the composition and by the process according to the invention, the following proportions of the constituents of said composition may be used:

Expanded or expansible microspheres: 1 to 60% and preferably 2 to 25%;

Cork powder and granules 1 to 85%, and preferably 15 to 75%;

Polyurethane glue: 10 to 70% and preferably at least 15%;

Latex emulsion: less than 15%;

Water: less than 15%;

Wax or paraffin less than 5%;

Catalyst less than 1%.

The percentages set forth hereinabove are, of course, expressed in terms of proportion by mass of the constituents with respect to the total mass of the mixture, i.e. the total mass of the composition employed in the manufacture of the stoppers or active parts of said stopper In the particular case of using the composition for manufacturing stoppers, the following proportions give particularly interesting results:

Expansible microspheres of copolymer of methyl methacrylate and acrylonitrile: between 5 and 15%;

Cork powder and/or granules between 40 and 60%;

Polyurethane glue: between 35 and 50%;

Latex and wax or water and catalyst: less than 10%.

We claim:

1. A composition useful for manufacture of products with an appearance of natural cork comprising;
   a. 1%–85% of particles of ligneous plant matter;
   b. 1%–60% of a plastics material of closed cellular structure having microspheres; said microspheres having a means dimension of less than 200 microns, said microspheres containing a hydrocarbon expansion agent; wherein said plastics material is selected from the group consisting of a polymer of vinyl chloride, a polymer of vinylidene chloride, a copolymer of vinyl chloride and acrylonitrile, a copolymer of vinylidene chloride, acrylonitrile, and methyl methacrylate, a copolymer of styrene and acrylonitrile, a polymer of ethylene, a polymer of vinyl acetate and a copolymer of methyl methacrylate and acrylonitrile; and
   c. 5%–70% of a binding agent.

2. Composition according to claim 1, wherein the ligneous material is natural cork.

3. Composition according to claim 1, wherein said hydrocarbon is isobutane.

4. Composition according to claim 1, wherein the particles of the ligneous material are fine and large; said fine particles having a means dimension of less than 300 microns and said large particles having a mean dimension of less 5 millimeters.

5. Composition according to claim 1, wherein said plastics material is a copolymer of methyl methacrylate and acrylonitrile.

6. A stopper comprising a composition according to claim 1.

7. A stopper comprising a composition according to claim 1, wherein said composition has a proportion of void or hollow spaces filled with air or fluid where the proportion of void or hollow spaces is greater than 50%.

8. Process for making a composition according to claim 1 comprising:
   a. mixing particles of ligneous plant matter with a plastics material of closed cellular structure;
   b. adding to said mixture, a binding agent to obtain a homogeneous pulverulent product;

c. introducing said homogeneous pulverulent product into a shaping device;

d. rapidly heating said product introduced in said shaping device, up to a temperature of 90°-200° C. to expand said cells; and e. removing the product from the shaping device, maintaining said product between 50° and 120° C.

9. A stopper comprising:

1%-85% of particles of natural cork;

1%-60% of a plastics material of closed cellular structure having microspheres of a mean dimension of less than 200 microns wherein said microspheres contain a hydrocarbon expansion agent;

c. 5-70% of a glue selected from polyurethane or an acrylic.

10. The stopper according to claim 6, wherein the mean dimension of the microspheres is between 10-200 microns.

11. Stopper according to claim 6, wherein said plastics material is a copolymer of methacrylate and acrylonitrile.

12. A stopper according to claim 6, further comprising a latex emulsion and pigments.

13. A stopper according to claim 6, wherein the mean dimension of said microspheres is between 40 and 100 microns.

14. A stopper according to claim 6, wherein said hydrocarbon is isobutane.

15. Stopper according to claim 6, where the microspheres of the plastics material are a copolymer of methyl methacrylate and acrylonitrile, said microspheres have a means dimension of between 40 and 100 microns and said hydrocarbon is isobutane.

* * * * *